United States Patent [19]

Freudenschuss

[11] 3,938,194

[45] Feb. 10, 1976

[54] METHOD OF AND APPARATUS FOR OBTAINING SYNCHRONOUS MOVEMENT BETWEEN TWO MEDIA

[75] Inventor: Otto Freudenschuss, Vienna, Austria

[73] Assignees: Karl Vockenhuber; Raimund Hauser, both of Vienna, Austria

[22] Filed: Oct. 30, 1973

[21] Appl. No.: 411,063

[30] Foreign Application Priority Data
Oct. 31, 1972  Austria ............................. 9255/72

[52] U.S. Cl. ...................... 360/71; 352/12; 360/80; 360/91; 360/3
[51] Int. Cl.² ................... G11B 15/18; G11B 31/00; G03B 31/00
[58] Field of Search ............... 352/5, 12, 15, 17, 20; 360/71–74, 90–91, 52, 80, 26–27, 69, 3; 179/100.1 R, 100.1 C, 100.1 S, 100.1 TC

[56] References Cited
UNITED STATES PATENTS

2,693,127  11/1954  Ortman ................................ 360/80
3,266,862  8/1966  Wagoner ............................... 352/12

*Primary Examiner*—Alfred H. Eddleman
*Attorney, Agent, or Firm*—Ernest G. Montague; Karl F. Ross; Herbert Dubno

[57] ABSTRACT

A method and an apparatus are described to enable one of two independently driven strips to be stopped for a predetermined period and then restarted in synchronism with the other strip which has been running continuously. Stoppage markers are provided on the first strip and synchronizing markers, which are interrupted when this first strip is to be stopped, are provided on the second strip. An integrator accumulating the output of a first sensor, responsive to the synchronizing markers on the second strip, feeds a coincidence circuit, also receiving the output of a second sensor responsive to the appearance of a stoppage marker on the first strip, which arrests the drive of the latter strip upon detection of a stoppage marker and restarts that drive after a period of interruption determined by the time constant of the integrator.

6 Claims, 2 Drawing Figures

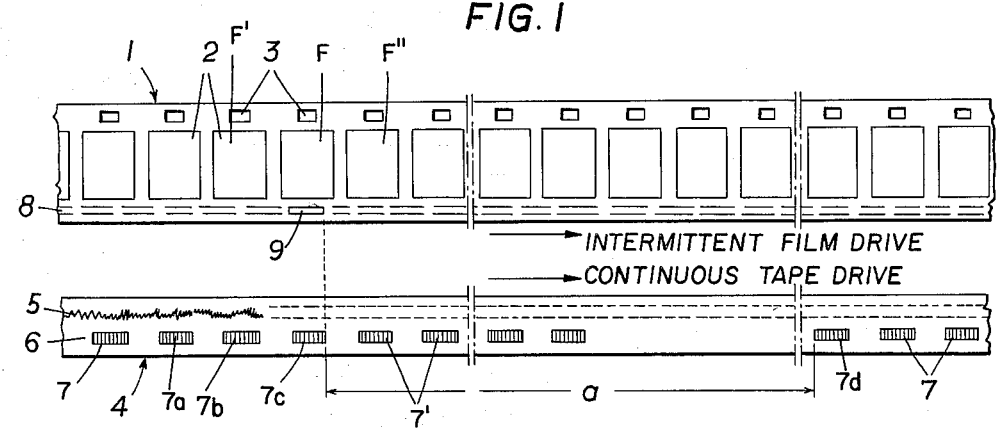
FIG. I
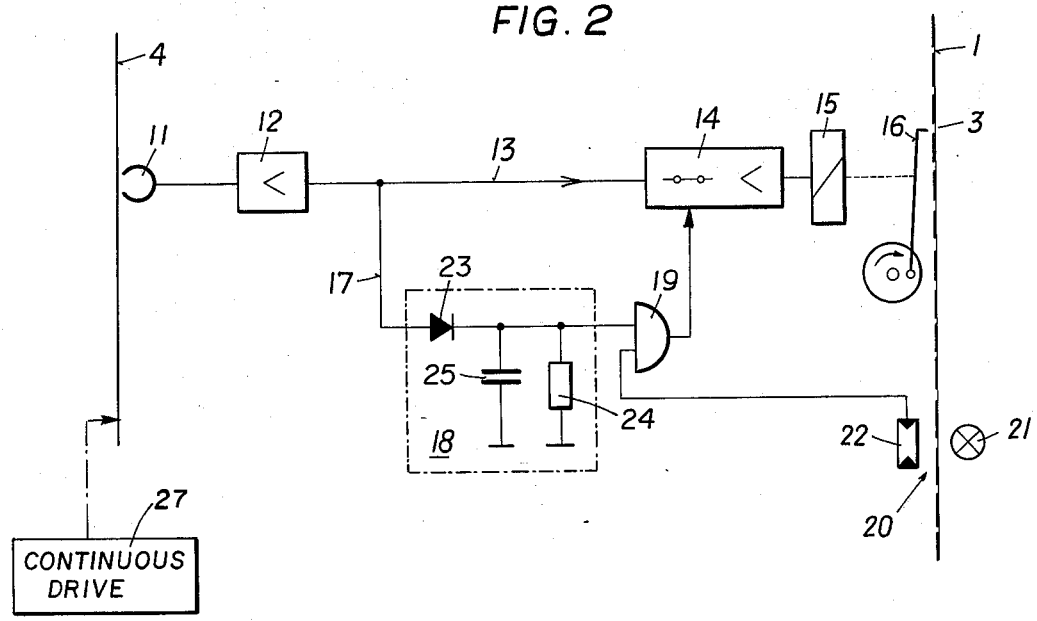
FIG. 2

METHOD OF AND APPARATUS FOR OBTAINING SYNCHRONOUS MOVEMENT BETWEEN TWO MEDIA

THE FIELD OF THE INVENTION

My present invention relates to a method of and apparatus for ensuring that a high degree of synchronization is maintained between the movements of two traveling data-carrying media, such as a film strip and a sound tape, which are to be run simultaneously.

THE PRIOR ART

Arrangements have been proposed for synchronizing an image medium with another data medium, both media being provided with control markers for changing the velocity of one of them; one such control marker appears on the second medium for each first of the image medium and gives rise to synchronizing signals during reproduction, the absence of such a control marker on the second medium resulting in stoppage of the image-carrying first medium for a corresponding length of time. A difficulty of this known system is that the correct coordination of the two data media cannot be restored after a synchronizing pulse is missed, thus resulting in a relative dephasing of the media. This also applies in the event that signal failure occurs in the middle of a synchronizing pulse which is then effectively divided into two smaller pulses separately advancing the image medium.

OBJECT OF THE INVENTION

My invention aims at providing an improved method of and apparatus for restoring synchronization of movement between two data strips or media after synchronization is temporarily lost, as by an intentional halting of one medium for a limited period.

SUMMARY OF THE INVENTION

In accordance with one aspect of the invention, in an apparatus having means for simultaneously processing two independently movable data strips or media, I provide first drive means for intermittently advancing the first medium, second drive means for continuously advancing the second medium, a first sensor positioned to scan the first medium and providing an output on detecting a first marking referred to hereinafter as a stoppage marker, and a second to detect a discontinuous sequence of second markings, referred to hereinafter as synchronizing markers, a for stepping the first drive means in response thereto. A control circuit, having a normal state in which it allows the first drive means to be stepped and an off-normal state in which this drive means is deactivated, is connected to a coincidence circuit responsive to the outputs of the two sensors stoppage marker by the first sensor causes the coincidence circuit to switch the control circuit to its off-normal state in which it is held as long as synchronizing markers and the stoppage marker are present; the subsequent disappearance of synchronizing markers causes the coincidence circuit to return the control circuit to its normal state so that stepping of the first drive means resumes as soon as synchronizing markers are once again read from the second medium.

The halting of the advance of the first medium, in response to a switching signal from the coincidence circuit, occurs in a position in which the first sensor is confronted by a stoppage marker identifying a part of the first medium, such as an image frame of a film strip, which enters the processing means of the apparatus substantially simultaneously with a stoppage zone on the second medium in which there exists a discontinuity in the sequence of synchronizing markers. With the aid of delay means connected to the coincidence circuit, specifically an integrating network inserted between that circuit and the second sensor, the switching signal is maintained for a period sufficient to confront the second sensor with the discontinuity in the sequence of synchronizing markers whereas the effect of a recurrence of these markers upon the coincidence means, after the discontinuity has passed, is retarded to enable renewed stepping of the first drive means by the first synchronizing marker following that discontinuity.

As a result of minor relative dephasing of the two media or strips during their concurrent run, the appearance of a stoppage marker at the first sensor may coincide with the reading of different synchronizing markers at the end of a series of such markers by the second sensor; this may somewhat modify the length of the ensuing standstill interval but will not otherwise affect the subsequent resynchronization.

In accordance with another aspect of the invention I provide a method of controlling the movement of two independently driven strip media by reading from the first medium a first track containing stoppage markers, reading from the second medium a second track containing synchronizing markers stopping the drive of the first medium when a stoppage marker is detected while continuing the drive of the second medium, responding to the disappearance of synchronizing markers on the second medium by preparing the drive for the first medium to recommence as soon as synchronizing markers are again read, resuming the drive of the first medium when synchronizing markers recur, and synchronizing the first drive with the repetition rate of the recurring synchronizing markers. Such a synchronizing system can be produced with relatively low expenditure in terms of construction. A further advantage is that interruption of the movement of the second data medium, e.g. a sound tape, is not required in order to restore synchronization. Thus it follows that a further saving is made because control means for stopping and restarting or changing the speed of the second data medium are unnecessary. The second data medium could also be another image strip, if desired.

BRIEF DESCRIPTION OF THE DRAWING

The above and other features of my invention will now be described in more detail, by way of example, with reference to the accompanying drawing, in which:

FIG. 1 shows two strip media whose movement is to be synchronized and illustrates various markings on the media which facilitate such synchronization; and FIG. 2 is a block diagram of a synchronization circuit utilizing the markings on the media of FIG. 1 to restore synchronization after it has been interrupted.

It is to be understood that the drawing shows only the circuitry necessary to carry out the invention, within an otherwise conventional system not further illustrated, for playing a sound tape while simultaneously projecting a film strip.

In such a system it is sometimes desirable to prolong the exposure of a particular image frame over an extended period while continuing to play the sound tape so that, for instance, a description of the projected image frame can be played off the sound tape without having to waste a considerable length of film. Obviously it is necessary to resume projection of the film in strict synchronism with the sound I shall now describe an arrangement for assuring such synchronism.

PREFERRED EMBODIMENT

In FIG. 1, a film strip 1 carries a series of image frames 2 and marginal perforations 3. The image medium 1 is to be projected while a further data medium, i.e. a recording tape 4 in the illustrated embodiment, is played. The recording tape has a sound track 5 and a control track 6 carrying an interrupted sequence of synchronizing markers 7. Any image frame 2 and perforation 3 is individually associated with respective marker 7. Synchronization is maintained in normal operation by the markers 7 which control a magnetic stepping drive including a conventional traction claw. However, the absence of markers 7 in a zone $a$ of the tape 4 results in stoppage for a correspondingly long period of time and continues the projection of the frame last exposed when zone $a$ was reached. Supplemental synchronizing markers 7' occur in the first part of stoppage zone $a$.

In accordance with my invention a stoppage marker 9 is recorded on a control track 8 of the film 1 at a location adjoining to the frame which, with proper synchronization, immediately precedes the stoppage zone a.

In the illustrated relative position the stoppage marker 9 registers precisely with the end of the series of synchronizing markers 7 ahead of the stoppage zone $a$. Marker 9 is shown aligned with a frame F to be projected for a prolonged period, but it may also be recorded in line with a preceding or following frame F' or F'', depending on the position of an associated reading device such as a sensor 20 shown in FIG. 2.

A second reading device or sensor in the form of a transducer head 11, scanning the control track 6 of the recording tape 4, serves for synchronizing the transport of the two strips. The head 11 reads the synchronizing markers 7, 7' and supplies an output stepping signals via an amplifier 12 to two circuit branches 13 and 17. Branch 13 feeds the stepping signals, derived from the synchronizing markers 7 by head 11, to an amplifier 14 forming part of a switching circuit for the actuation of a magnet 15 to advance the film 1 through a traction claw 16. The second branch 17, energized from amplifier 12 in parallel with the first branch, 13, comprises an integrator 18 including a diode 23 for rectifying the stepping signals and for an RK network 24, 25 storing them for a predetermined period of time. The integrator supplies one input of an AND gate 19 when the charge stored in its capacitor 25 exceeds a predetermined value. The other input of the AND gate 19 is connected to the first reading device 20 which responds to the passing of a stoppage marker 9 on the film 1. The illustrated sensor 20 comprises a light source 21 and a photoelectric transducer 22. It is not essential for the stoppage marker 9 to be optically detectable inasmuch as many other types of markers are equally suitable.

The output of the AND gate 19 is fed to the amplifying element 14 to control its switching function.

OPERATION OF PREFERRED EMBODIMENT

For as long as the transducer head 11 detects markers 7, 7' on the control track 6 of the sound tape 4, the resulting stepping pulses pass into the integrator 18 to provide a capacitor charge sufficient to maintain an operating voltage on one input of the AND gate 19. Initially however, gate 19 does not conduct as there is no signal on the other input therof tied to the reading device 20. It is only when the reading device 20 recognizes the presence of a stoppage marker 9 that the second input of AND gate 19 is energized to generate a switching signal which open-circuits the amplifier 14. The circuit from conductor 13 to the magnet 15 is thus interrupted so that film motion ceases. During this period the markers 7' are ineffectual to stop the film 1, in view of the deactivation of the film drive 15, 16, but are nevertheless fed into the integrator 18 to maintain the gate 19 open since the film 1 is stopped and the stoppage marker 9 remains in the zone of the reading device 20. The amplifier 14 remains open-circuited until the disappearance of supplemental markers 7', owing to the continuing energization of the input of the lower AND gate 19 bu sensor 20. Even after the transducer head 11 has ceased to emit stepping signals, the AND gate 19 continues to be conduct for a short time determined by the time constant of network 24, 25 in integrator 18.

Eventually, in the second part of zone $a$ (FIG. 1), the AND gate 19 closes and the energizing circuit 13 for the magnet 15 is once again completed. Initially this does not result in operation of the drive claw 16 since this part of zone a is devoid of markers and therefore does not produce any stepping signals. The claw 16 recommences operation only on the resumption of reading of a new series of synchronizing markers 7 on the right of zone $a$ In FIG. 1, synchronization being then assured because the frame which registers with the perforation engaged in response to next exposed is the one which the first marker 7 causing resumption of the claw motion.

The integrator 18 acts not only as an accumulator for the stepping pulses but also as a delay device. If integrator 18 were absent, the first marker 7 to follow the zone $a$ would immediately reopen the AND gate 19 whose other input is still energized from the stoppage marker 9 which throughout the zone $a$ has been read by the device 20. In this case the AND gate 19 would cut off the amplifier and the film drive would not be stepped. The integrator 18 takes time to charge its capacitor 23 once again from the markers 7 when they reappear in the wake of the zone $a$. During this time, the AND gate 19 is prevented from opening and the stoppage marker 9 on the film is stepped out of the reading area of the device 20. Synchronization is nevertheless assured by the signals from the head 11 applied to the claw 16 by way of the branch 13, the amplifier 14 and the magnet 15.

If the synchronous progress of the two data media 1, 4 is subject to phase deviations during a performance, the stoppage marker 9 may coincide with the penultimate marker 76 or the antepenultimate marker 7a instead of the last marker 7c of a series, or with one of the supplemental markers 7'. This will have no effect on resynchronization because these phase deviations are compensated for by a longer or shorter standstill of the stopped image F and in all cases the first image F'' to follow the stopped image is projected upon the occurrence of the first marker 7d which follows the zone $a$.

The described embodiment of the invention admits of numerous modifications; thus, for example it permits operation with negative markers on film 1 whose absence then initiates stoppage provided of course that the circuits of FIG. 2 are suitably modified.

The independent drive means for continuously advancing the strip 4 and intermittently advancing the film 1 have been indicated by arrows and legends in FIG. 1. The drive for tape 4 has been shown at 27 in FIG. 2.

While I have disclosed several embodiments of the present invention, it is to be understood, that this embodiment is given by example only and not in a limiting sense.

I claim:

1. In an apparatus having means for simultaneously processing two independently movable recordbearing stips, in combination:
   first drive means for intermittently advancing a first record strip provided with at least one first marking;
   second drive means for continuously advancing a second record strip provided with a sequence of second markings having a discontinuity in a zone entering the processing means substantially simultaneously with a part of said first strip identified by said first marking;
   first sensing means for detecting said first marking on said first strip and emitting a first output signal in response thereto;
   second sensing means for detecting said second markings on said second strip and emitting a series of second output signals in response thereto, said first drive means being connected to said second sensing means for actuation by said second output signals to step said first strip in response to said second markings;
   coincidence means connected to said first and second sensing means for emitting a switching signal upon simultaneous reception of said first and second output signals;
   control means for said first drive means connected to said coincidence means for halting the advance of said first strip in response to said switching signal in a position in which said first marking confronts said first sensing means; and
   delay means inserted between said second sensing means and said coincidence means for retarding the effect of a recurrence of said second markings upon said coincidence means, thereby enabling renewed actuation of said first drive means by said second output signals in response to the second markings which follow said discontinuity.

2. The combination defined in claim 1 wherein said delay means comprises an integrating network for said second output signals effective to maintain said switching signal for a limited period following interruption of said sequence.

3. The combination defined in claim 2 wherein said first sensing means is provided with an output circuit including a first branch leading to said first drive means and a second branch leading to said coincidence means, said integrating network being included in said second branch.

4. The combination defined in claim 3 wherein said coincidence means comprises an AND gate generating said switching signal, said control means including an amplifier in said first branch connected to be cut off by said switching signal.

5. The combination defined in claim 1 wherein said first strip is provided with perforations and said first drive means comprises a reciprocating traction claw engageable in said perforations.

6. A method of controlling the movement of an intermittently driven first record strip and a continuously driven second record strip, comprising the steps of scanning a first track on the first strip containing at least one stoppage marker, scanning a second track on the second strip containing synchronizing markers, advancing the first strip by one step in response to any snychronizing marker detected on said second track in the absence of a stoppage marker on said first track, halting the advance of the first strip upon detection of a stoppage marker on said first track while continuing the drive of the second strip, responding to the disappearance of synchronizing markers on the second track by temporarily making the drive for the first strip insensitive to the presence of a control marker on said first track, and thereupon resuming the advance of the first strip in response to the recurrence of synchronizing markers on said second track.

* * * * *